April 28, 1942. W. H. HENSON ET AL 2,281,003
REFRACTORY BRICK
Filed Aug. 24, 1940 2 Sheets-Sheet 1
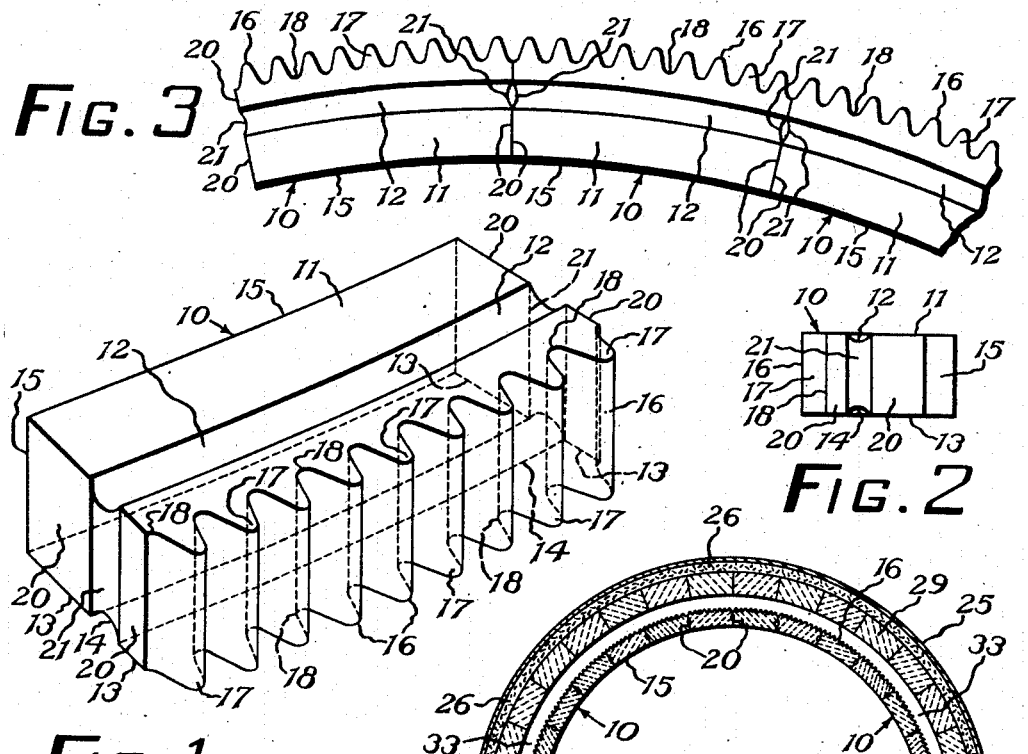
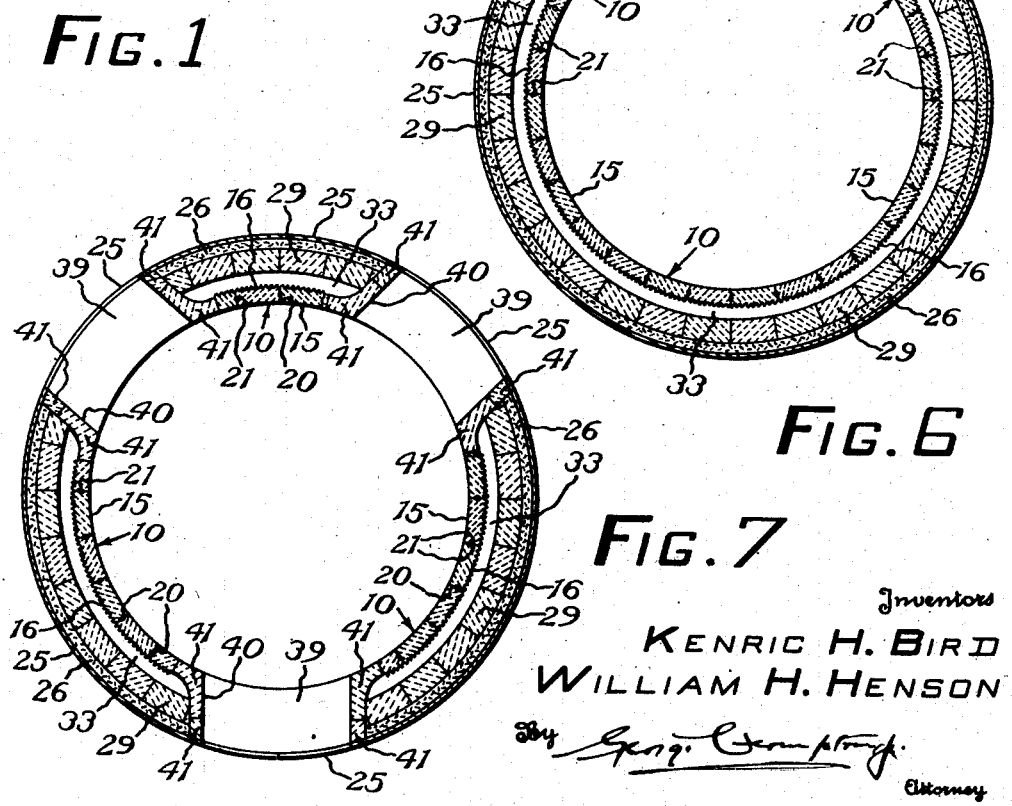
Inventors
KENRIC H. BIRD
WILLIAM H. HENSON
Attorney April 28, 1942.  W. H. HENSON ET AL  2,281,003
REFRACTORY BRICK
Filed Aug. 24, 1940  2 Sheets-Sheet 2
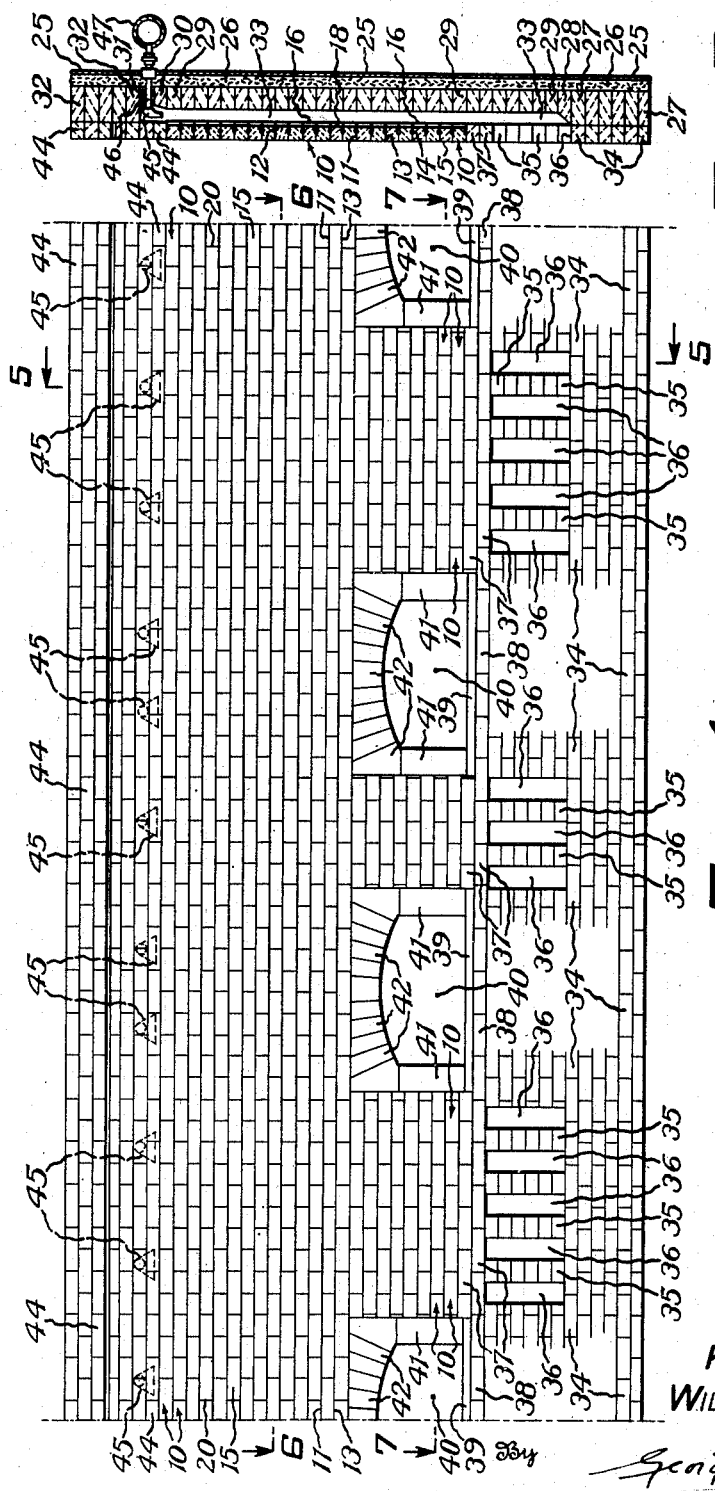
Inventors
KENRIC H. BIRD
WILLIAM H. HENSON Patented Apr. 28, 1942

2,281,003

UNITED STATES PATENT OFFICE 2,281,003

REFRACTORY BRICK

William H. Henson and Kenric H. Bird, Worcester, Mass., assignors to Norton Company, Worcester, Mass., a corporation of Massachusetts Application August 24, 1940, Serial No. 354,074

1 Claim. (Cl. 72—101)

The invention relates to refractory bricks, particularly for the construction of gas producers for the manufacture of water gas and the like.

One object of the invention is to provide a more durable refractory brick. Another object of the invention is to reduce or eliminate clinker formation in gas producers without short-circuiting the draft. Another object of the invention is to provide a brick of practical shape for molding from which can be readily constructed the refractory lining of an efficient gas producer. Other objects will be in part obvious or in part pointed out hereinafter.

The invention accordingly consists in the features of construction, combinations of elements, and arrangements of parts, all as will be illustratively described herein, and the scope of the application of which will be indicated in the following claim.

In the accompanying drawings showing one of many possible embodiments of the features of this invention, Figure 1 is a perspective view of a brick constructed in accordance with the invention;

Figure 2 is an end view of the brick;

Figure 3 is a plan view of a number of bricks assembled to provide part of the refractory wall of a gas producer;

Figure 4 is an internal developed view of a gas producer below the top thereof, which has been constructed in part with bricks according to the present invention;

Figure 5 is a vertical sectional view taken along the line 5—5 of Figure 4;

Figure 6 is a horizontal sectional view taken along the line 6—6 of Figure 4; and Figure 7 is a horizontal sectional view taken along the line 7—7 of Figure 4.

As conducive to a clearer understanding of the present invention, it is noted that gas producers have to be shut down from time to time for the removal of slag and clinkers which form on the fire side of the refractory lining. Such slag and clinkers are customarily removed with crowbars or similar iron instruments and in the removal thereof portions of the lining are frequently broken off. Thus the producer lining is gradually destroyed and in the course of time has to be renewed. Any brick, therefore, which less readily accumulates a deposit of slag and/or clinkers will measurably increase the life of a producer lining made therefrom and as a result permit the manufacture of water gas at less expense.

In an effort to achieve this desired result, it has hitherto been proposed to make a gas producer with a refractory lining having a multitude of passages from an exterior space into the fire zone. In the operation of gas producers, first air and then steam is forced through the bed of burning coke or other fuel. Such passages have short-circuited the draft in these gas producers and thereby decreased their efficiency. Using bricks according to the present invention, the formation of slag and clinkers is materially reduced without short-circuiting the draft and thus the over-all efficiency of the producer is increased as compared with previous gas producers, whether of the type having passages through the refractory lining or otherwise.

Referring now to Figures 1 and 2, a brick 10 constructed in accordance with the present invention has a plane top face 11 interrupted by a groove 12. The brick has a plane bottom face 13 interrupted by a groove 14, the planes of the faces 11 and 13 being parallel. The groove 12 is right over the groove 14 and preferably these are located about a third of the way from the outside to the inside for a reason which will presently appear. The brick 10 has a cylindrically curved inside surface 15 and a corrugated outside surface 16. The corrugations 17 of the outside surface extend from a base tangent to the intermediate grooves 18 which is a cylindrical surface concentric with the surface 15. The end faces 20 are planes radial to the cylinder of which the surface 15 is a part. Extending between the dovetails 12 and 14 on the end faces 20 are shallow grooves 21.

Referring now to Figures 4, 5, 6 and 7, the gas producer may comprise an outer cylindrical iron shell 25 inside of which is a layer of packing 26 and then a series of courses of firebrick 27, 28, 29, 30, 31 and 32. The bricks 27 and the bricks 32 are wide bricks, the bricks 27 being located at the bottom of the producer and the bricks 32 at the top of the producer just below the cap. The bricks 29 are narrow bricks to leave an air space 33. The bricks 28, 30 and 31 have special shapes, as shown. Collectively the bricks 27, 28, 29, 30, 31 and 32 form a cylindrical firebrick wall and the foregoing description is merely illustrative as this wall may be several bricks in thickness at any point.

Inside the foregoing firebrick wall at the bottom of the producer is a further series of courses of firebricks 34 forming an inward continuation of the firebrick wall. Above the bricks 34 are alternately firebricks 35 in columns and openings 36 forming a communication between the air passage 33 and the inside of the producer. Above the brick columns 35 and the openings 36 is a course of firebricks 37 and an interrupted course 38 spaced by refractory sills 39 of openings 40. The openings 40 are framed by the sills 39, angle refractory shapes 41, and arches 42 formed of arch bricks, as shown.

The grate lining is or may be at the level of the sills 39. From there to the level of the under side of the bricks 30, I have shown the bricks 10 of the present invention in a series of courses. Above these special bricks 10 is another series of courses of firebricks 44.

It should be understood that the details of the structure of the producer are given herein merely for illustration of one effective manner of utilizing bricks according to the present invention.

Headers 45 are connected by pipes 46 to a bustle pipe 47 extending around the producer, through which first air and then steam is supplied to the producer.

In the operation of the producer a charge of coke or other fuel is introduced through the top through doors (not shown) upon the grate and then the openings 40 are sealed with brick and iron doors in a customary manner. The fire having been lighted, air is blown through the headers 45 which is directed downwardly through the passage 36 and thence under the grate. This action raises the temperature of the coke or other fuel to incandescence. Then the air is turned off and steam is admitted via the bustle pipe 47 and headers 45. The steam is directed through the same passages 36 to below the grate and the water molecules are split by the fire, the oxygen combining with the carbon of the coke to form carbon monoxide, and hydrogen being released, thereby forming blue water gas.

The gas producer constructed in part with the bricks of this invention does not offer any path to short circuit the draft of air or steam. On the contrary, air as well as steam is directed downwardly around the fire bed and is superheated by the heat which is radiated outwardly through the bricks 10. Thereby when the air is on, a very hot fire is quickly developed and when steam is on, the chemical reaction goes to completion and the producing runs are comparatively longer. The corrugated surface formed of the corrugations 17 and grooves 18 presents a much larger radiating surface than is presented by bricks having cylindrical outer surfaces and thereby heat transference through the bricks 10 is measurably increased. This not only cools the interior producer wall from the tops of the arches 42 to the line of the bricks 30 but also increases the superheating of the air and steam both of which results are desirable. Thus no heat is lost but the refractory lining is maintained at a much lower temperature. The inside faces 15 are not corrugated, thus any clinkers that may be formed are easily removed. In prior constructions having openings through the refractory lining, clinker formation was reduced, but such clinkers as did form were hard to remove owing to the broken surface of the refractory lining caused by the presence of the openings.

The bricks or blocks 10 are preferably made of silicon carbide which is known to be highly refractory and for a refractory material an excellent conductor of heat. Silicon carbide also has comparatively great strength at high temperatures as compared with other materials. It is desirable that the blocks 10 have a high content of silicon carbide, for example of the order of 95%, the remainder being bond. A highly practical mixture for the manufacture of silicon carbide bricks comprises 95% silicon carbide grains, 2% bentonite, .5% ferric oxide, and the remainder 2½% of a temporary binder such as goulach. A refractory so constituted is described in U. S. patent to Henry C. Fisher, No. 2,118,789. However, other mixtures for the manufacture of silicon carbide bricks may be used and as far as certain features of the invention are concerned, refractory material other than silicon carbide might be employed.

It is desirable that there be a substantial number of the corrugations 17 and grooves 18. As a preferred example, each brick is shown as having nine corrugations. Preferably one-half of a groove 18 is located at each end of each brick. Thereby the bricks 10 may be joined together, forming an unbroken corrugated outer wall. This also leaves corners that are stronger in the "green" brick than if the corrugations extended to the edges, and the bricks are also easier to mold. The corrugations can be matched in a vertical direction by the bricklayer but in laying the refractory wall the joints will preferably be broken in adjacent courses. That is to say, divisions between No. 1 course of bricks will break joints with No. 2 course of bricks and be lined up with No. 3 course of bricks, and so on. The entire refractory wall can expand and contract without breaking any bricks owing to its cylindrical shape.

The courses of bricks 10 are interlocked by filling the grooves 12 and 14 with cement. Adjacent bricks 10 may be interlocked with cement in the grooves 21. These interlocking means are located well to the outside so that a large part of the refractory wall can be worn away before any brick will come loose. We prefer to use grooves filled with cement to interlock the bricks, since it is easier to lay them and if necessary an individual brick may be more readily removed by fracturing the cement, but interlocking grooves and projections may be substituted.

Bricks 10 can readily be molded, the top and bottom plates of the mold forming the plane tops 11 and bottoms 13, respectively, of the bricks 10. One side of the mold will be corrugated and as the corrugations are vertical and so also are the grooves 21, the blocks can be readily stripped from the molds without breakage. The refractory mixture is first molded under pressure, then the formed "green" bricks are stripped from the mold and transferred to kilns where they are fired in the customary manner for firing silicon carbide articles.

It will thus be seen that there has been provided by this invention an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

We claim:

A refractory brick for an inner, heat conductive, annular wall of a gas producer composed of ceramic bonded silicon carbide grains shaped substantially as a segment of said annular wall and having top and bottom faces lying in substantially parallel planes, end faces arranged as radial planes, an inner partial cylindrical surface which forms a smooth non-clinkering wall, and a corrugated face forming a portion of an outer heat exchanging surface for said wall, said brick having a circumferential groove cutting each of said plane faces and arranged for the reception of cement which interlocks the bricks together in said wall.

KENRIC H. BIRD.
WILLIAM H. HENSON.